(12) United States Patent
Jung

(10) Patent No.: US 12,054,911 B2
(45) Date of Patent: Aug. 6, 2024

(54) PROTECTIVE CANOPY, EARTH WORKING MACHINE AND METHOD FOR CHANGING POSITION OF THE PROTECTIVE CANOPY

(71) Applicant: Wirtgen GmbH, Windhagen (DE)

(72) Inventor: Frank Jung, Königswinter (DE)

(73) Assignee: Wirtgen GmbH, Windhagen (DE)

(*) Notice: Subject to any disclaimer, the term of this patent is extended or adjusted under 35 U.S.C. 154(b) by 219 days.

(21) Appl. No.: 17/834,655

(22) Filed: Jun. 7, 2022

(65) Prior Publication Data
US 2022/0403618 A1   Dec. 22, 2022

(30) Foreign Application Priority Data

Jun. 16, 2021 (CN) .......................... 202110666833.1

(51) Int. Cl.
*E02F 9/16* (2006.01)

(52) U.S. Cl.
CPC ................... *E02F 9/163* (2013.01)

(58) Field of Classification Search
CPC ........ B60J 7/16; B60R 21/11; B62D 33/0617; B62D 33/0625; E02F 9/16; E02F 9/163; E02F 9/166
USPC ................................................... 296/187.13
See application file for complete search history.

(56) References Cited

U.S. PATENT DOCUMENTS

| | | | | |
|---|---|---|---|---|
| 3,713,688 A * | 1/1973 | Monroe | ............. | B66F 9/07545 296/107.03 |
| 3,917,310 A | 11/1975 | Mitsuishi | | |
| 7,152,903 B2 * | 12/2006 | Westendorf | ........ | B62D 33/0621 296/210 |
| 8,827,374 B2 * | 9/2014 | Huhn | ....................... | B60J 7/201 299/39.2 |
| 10,822,041 B2 * | 11/2020 | Barimani | ............. | E01C 23/088 |
| 2014/0035344 A1 | 2/2014 | Huhn | | |
| 2022/0203803 A1 * | 6/2022 | Tanaka | ................... | B60H 1/245 |

FOREIGN PATENT DOCUMENTS

CN   109972480 A   *   7/2019

OTHER PUBLICATIONS

European Search Report for corresponding patent application No. EP 22 17 9183, dated Nov. 25, 2022, 3 pages (not prior art).

* cited by examiner

*Primary Examiner* — Jason S Daniels
(74) *Attorney, Agent, or Firm* — Lucian Wayne Beavers; Patterson Intellectual Property Law, PC

(57) ABSTRACT

A protective canopy includes a canopy body, which is switchable between a first position and a second position, a canopy base, a first linkage and a second linkage for connecting the canopy body to the canopy base, each of the first linkage and the second linkage is pivotally connected to both the canopy body and the canopy base, respectively, and pivot axes formed at the pivoting connection positions between each of the first and second linkage and each of the canopy body and the canopy base are parallel to each other, such that the canopy body is switchable relative to the canopy base between the first position and the second position by manipulating the first and/or second linkages and/or the canopy body. An earth working machine having such protective canopy and a method for changing position of a protective canopy of earth working machine are also disclosed.

26 Claims, 5 Drawing Sheets

PROTECTIVE CANOPY, EARTH WORKING MACHINE AND METHOD FOR CHANGING POSITION OF THE PROTECTIVE CANOPY

BACKGROUND OF THE INVENTION

Field of the Invention

The invention relates to a protective canopy for an earth working machine, to earth working machines including the protective canopy, and to methods of operation of such earth working machines.

Description of the Prior Art

Regarding a construction machine, such as an earth working machine, a protective canopy is provided above the operator's platform to protect the operator from sun or rain. In the state of the art, the change of position of the protective canopy arranged on the construction machine is implemented by means of a bearing mechanism, such as sliding bearings and rolling contact bearing also referred to as ball screw. However, the position change structure implemented by a sliding bearing makes the protective canopy get stuck very frequently and easily during the position changing, and it requires considerable force to make the protective canopy move. Although the position change structure implemented by a rolling contact bearing requires les force, the cost of the rolling contact bearing is very high.

Therefore, there is a great need for a protective canopy position change structure that can easily cause the protective canopy to change position with less force and at a lower cost.

SUMMARY OF THE INVENTION

An object of the invention is therefore to refine the protective canopy in such a way that the position of the canopy body can be better changed with less force and at a lower cost than canopy of construction machine of the existing art. In addition, it is an object of the invention to provide an earth working machine having such protective canopy, making the operator of the machine be better protected.

According to the present invention the objects are achieved by the following features of the protective canopy.

The protective canopy comprises a canopy body, which is switchable between a first position and a second position, a canopy base, which is stationary, a first linkage and a second linkage for connecting the canopy body to the canopy base, each of the first linkage and the second linkage is pivotally connected to both the canopy body and the canopy base, respectively, and pivot axes formed at the pivoting connection positions between each of the first and second linkage and each of the canopy body and the canopy base are parallel to each other, such that the canopy body is switchable relative to the canopy base between the first position and the second position by manipulating the first and/or second linkages and/or the canopy body.

According to the protective canopy of the present invention, the first linkage, the second linkage, the canopy body and the canopy base constitute a four-bar linkage mechanism, such that the position of the canopy body can be better changed with less force and at a lower cost than the canopy of the construction machines of the existing art.

The protective canopy according to the present invention has a first position and a second position, and the switching of the protective canopy according to the present invention between the first operating position and the second transport position is achieved by a four-bar linkage mechanism formed by the canopy body of the protective canopy, the canopy base, the first linkage and the second linkage together. Specifically, the canopy body of the protective canopy and the canopy base are connected by means of the first linkage and the second linkage, wherein the first linkage being pivotally connected to each of the canopy body and the canopy base, respectively, and the second linkage being similarly pivotally connected to each of the canopy body and the canopy base, respectively, and the pivot axes at the connection points between the first linkage and each of the canopy body and the canopy base and the pivot axes at the connection points between the second linkage and each of the canopy body and the canopy base parallel to each other, such that the canopy body, the canopy base, the first linkage and the second linkage together form a four-bar linkage mechanism capable of being manipulated. By manipulating at least one of the canopy body, the first linkage and the second linkage, the canopy body can be switched with respect to the canopy base between the first position and the second position.

This involves the advantage that, compared to the existing art, the protective canopy of the present invention has no intermediate position but only the transport (very left) and the operating (very right) position, but the positions of the canopy according to the present invention can be better changed with less force and at a lower cost than canopy of construction machine of the existing art.

According to the protective canopy of the present invention, the protective canopy further comprises at least one manipulation component, which is capable of driving at least one of the first linkage, the second linkage and the canopy body, the canopy body is switchable relative to the canopy base between the first position and the second position by manipulating the manipulation component.

According to the protective canopy of the present invention, the at least one manipulation component is attached to the first linkage and/or the second linkage, and the at least one manipulation component and corresponding linkage form a lever structure with a pivoting point where they are connected. This involves the advantage of providing an effortless and cost-effective way of switching the canopy body between its first position and its second position. In a preferred embodiment, the manipulation component is attached to one of the first and second linkage, and the manipulation component together with the corresponding linkage forms a lever structure, wherein a pivoting connection point formed by the pivoting connection between the corresponding linkage and one of the canopy body and the canopy base acts as a fulcrum of the lever structure. Alternatively, the at least one manipulation component is attached to the first and second linkage, respectively, and the manipulation component and the linkage to which the manipulation component form a lever structure.

According to the protective canopy of the present invention, the at least one manipulation component comprises a connecting section connected to the first and/or the second linkage and a force-application section connected to the connecting section, the connecting section of the at least one manipulation component is in the line of two pivotally connection points of the linkage to which the at least one manipulation component is attached, and the force-application section is at an angle of 100-150° to the connecting section. Here this will be illustrated based on the case where the manipulation component is attached to the second linkage. Specifically, the second linkage has a first pivoting connection point pivotally connected to the canopy body and a second pivoting connection point pivotally connected to the canopy base, the line between the first pivoting connection point and the second pivoting connection point being at an angle with the force-application section of the manipulation component, which ranges from 100-150°. In a preferred embodiment, the force-application section is at an angle (a) of 120-130° to the connecting section. In some more preferred embodiments, the angle is 120°, 125°, or 130°. This involves the advantage that in this range of angle, a smaller force is required to drive the corresponding linkage to which the manipulation component is attached.

According to the protective canopy of the present invention, the at least one manipulation component is integrated with the first and/or second linkage. In a preferred embodiment, the manipulation component is integrated with one of the first and second linkage. This involves the advantage of enabling the manipulation component to be manufactured, installed, and used integrated with the corresponding linkage to which the manipulation component is attached, which not only provides better structural strength, but also reduces the number of parts required, ease of installation and use, as well as cost reduction.

Alternatively, according to the protective canopy of the present invention, the at least one manipulation component is a hydraulic, electric, or pneumatic driving device, which acts directly on at least one of the first linkage, the second linkage and the canopy body, or drives at least one of the first linkage, the second linkage and the canopy body through an indirect driving mechanism. In another alternatively embodiment, the manipulation component is connected to the first and/or second linkage by an additional pivoting connection, for example the manipulation component forms a new pivoting-related structure with the first and/or second linkage, which allows the first and/or second linkage to be driven for a movement.

According to the protective canopy of the present invention, both the first linkage and the second linkage are bent outwardly, respectively. This involves the advantage of facilitating the movement of the canopy between the first position and the second position and facilitating the transmission of the driving force introduced by the manipulation component between the linkages and the canopy body.

According to the protective canopy of the present invention, the canopy body abuts against the canopy base at both the first position and the second position of the canopy body. This involves the advantage that the canopy body can be stopped in its desired positions by abutting against the canopy base, without the need for additional stopping elements.

According to the protective canopy of the present invention, the canopy body is provided with a connection member moving along with the canopy body, the first linkage and the second linkage are each pivotally connected to the connection member. In a preferred embodiment, the connection member is integrated with the canopy body. Alternatively, the attachment member is attached to the canopy body by existing known mechanical connecting means, such as welding or bolting.

According to the protective canopy of the present invention, the connection member of the canopy body abuts against the canopy base at both the first position and the second position of the canopy body.

Alternatively, the first linkage is pivotally connected to the canopy base by a first shaft, and the second linkage is pivotally connected to the canopy base by a second shaft, the connection member abuts against the first shaft at the first position and abuts against the second shaft at the second position. In a preferred embodiment, the bottom edge of connection member is provided with one opening, each of the first shaft and the second shaft is accommodated in the opening at the first position and the second position of the canopy body, respectively.

According to the protective canopy of the present invention, a pair of the first linkage and a pair of the second linkage are provided on two opposite sides of the canopy base and the connection member, respectively.

According to the protective canopy of the present invention, the protective canopy further comprises a locking device for locking the canopy body at its first and second position. In a preferred embodiment, the locking device is arranged on the canopy body and moves along with the canopy body, and two locking holes are arranged on the canopy base for cooperating with the locking device when the canopy body reaches its first and second positions, respectively. Alternatively, the locking device is arranged on the canopy base, and the locking holes for cooperating with the locking device are arranged on the canopy body.

According to the protective canopy of the present invention, the locking device is a spring-loaded pull in latch, which comprises a housing, a pin and a spring element, the pin is moveable between an original position and an extracted position, the spring element is not compressed when the pin is in the original position, while compressed when the pin is in the extracted position. Specifically, the housing is arranged on the canopy body, the pin is arranged in the housing, and the spring is arranged in the housing for providing load-force to the pin, and the pin has an original position (also referred to as a closing position) and an extracted position (also referred to as an opening position) where the pin is held stationary on the housing against the load of the spring element, and the pin is capable of being returned to its original position by the action of the spring element when the pin is released from its extracted position.

When the canopy body reaches its first position and second position, the pin of the locking device is in its original position and is inserting into the corresponding locking hole, so that the canopy body is locked in its first position and second position. In a preferred embodiment, at least one radial stop is provided on the pin, and the pin can be kept at the extracted position by rotating the pin to make the stop engaged with corresponding part in the housing. The pin can be pulled outwards in the direction of its longitudinal axis and then be rotated around the longitudinal axis, so that the stop of the pin fits into a corresponding part in the housing, such as a positioning portion provided at the end of the housing or inside the housing, so that the pin is positioned in its extracted position that allows the canopy body to be unlocked. Therefore, before shifting the canopy from its first position to second position and from its second position to first position, the operator can switch the pin of the locking device from its original position to its extracted position. Now the canopy is free to be shifted from its first operating position to second transport position or vice versa.

According to the protective canopy of the present invention, two switch elements are provided on the canopy base and arranged near to the movement trajectory of the pin when the canopy body moves from the first position to the second position and vice versa. During the movement of the canopy body from the first position to the second position and from the second position to the first position, the two switch elements enable the pin to be released from its extracted position, respectively.

According to the protective canopy of the present invention, the pin has a wing which is radially extended from the end of the pin, and when the wing contacts with the switch elements, it triggers the pin to rotate so that the pin is released from the extracted portion. During the movement of the canopy body from the first position to the second position and from the second position to the first position, the pin is capable of being toggled to rotate by the engagement between the wing and the corresponding switch element, so that the pin is capable of being released from its extracted position when the canopy reaches its final position.

As soon as the canopy body leaves it final position, the wing of the pin of the locking device has to pass the two switch elements, respectively. The corresponding switch element will engage the wing of the pin of the locking device and will enable the pin to rotate, resulting in the pin being able to be released from its extracted position when the canopy reaches its final position, i.e., the first operating position and the second transport position. According to the protective canopy of the present invention, the spring element cannot push out the pin instantly before the canopy reaches its final position, i.e., there is no corresponding hole in the intermediate position where the pin can go in. Therefore, only when the final position is reached, the spring can push the pin out and into the corresponding locking hole and close the latch, i.e., fix the canopy in its final position.

In a preferred embodiment, the switch elements are a L-shaped flags, wherein at least a vertical portion of the L-shaped flag will contact the wing of the pin of the locking device during the movement of the canopy body, such that the pin is driven to rotate and then capable of being released from its extracted position when the canopy body reaches its final position.

According to the protective canopy of the present invention, the first position is an extended operating position of the canopy body, and the second position is a retracted transport position of the canopy body relative to the extended operating position.

The present invention further provides an earth working machine, the earth working machine comprises an operator's platform and the protective canopy according to the above mentioned, the protective canopy is arranged corresponding to the operator's platform for protecting the operator.

According to the earth working machine of the present invention, the canopy body of the protective canopy is switchable between the first position and the second position with respect to the operator's platform in the horizontal direction of the earth working machine.

According to the earth working machine of the present invention, the first position is an extended operating position where the canopy body of the protective canopy protrudes from the lateral outer side of machine frame of the earth working machine, and the second position is a retracted transport position where the canopy body of the protective canopy does not protrude outside the footprint of the earth working machine. That is, the canopy body of the protective canopy protrudes from the lateral outer side of machine frame of the earth working machine when the canopy body is extended to the operating position, and the canopy body of the protective canopy does not protrude outside the footprint of the earth working machine when the canopy body is retracted to the transport position. This involves the advantage that the protective canopy of the earth working machine according to the present invention is shiftable from transport position where it does not protrude outside the footprint of the machine to the operating position where it protrude from the lateral outer side (also referred to so called zero-extension side, which in a preferred embodiment is the right hand side of the machine) of machine frame of the earth working machine to better cover the operator from sun and rain. The protective canopy of the earth working machine has no intermediate position but only the transport (very left) and the operating (very right) position. This involves the advantage of providing an effortless and cost-effective way of switching the canopy body between its first position and its second position.

According to the earth working machine of the present invention, the earth working machine is a road milling machine, recycler, stabilizer or surface miner.

The invention further relates to a method for changing position of a protective canopy of earth working machine, the above-mentioned protective canopy is arranged corresponding to the operator's platform for protecting the operator, the method comprises steps of extending and retracting the canopy body of the protective canopy relative to the operator's platform of the earth working.

BRIEF DESCRIPTION OF THE FIGURES

Embodiments of the present invention are explained in more detail below with reference to the Figures, in which.

DETAILED DESCRIPTION

Figure 1:
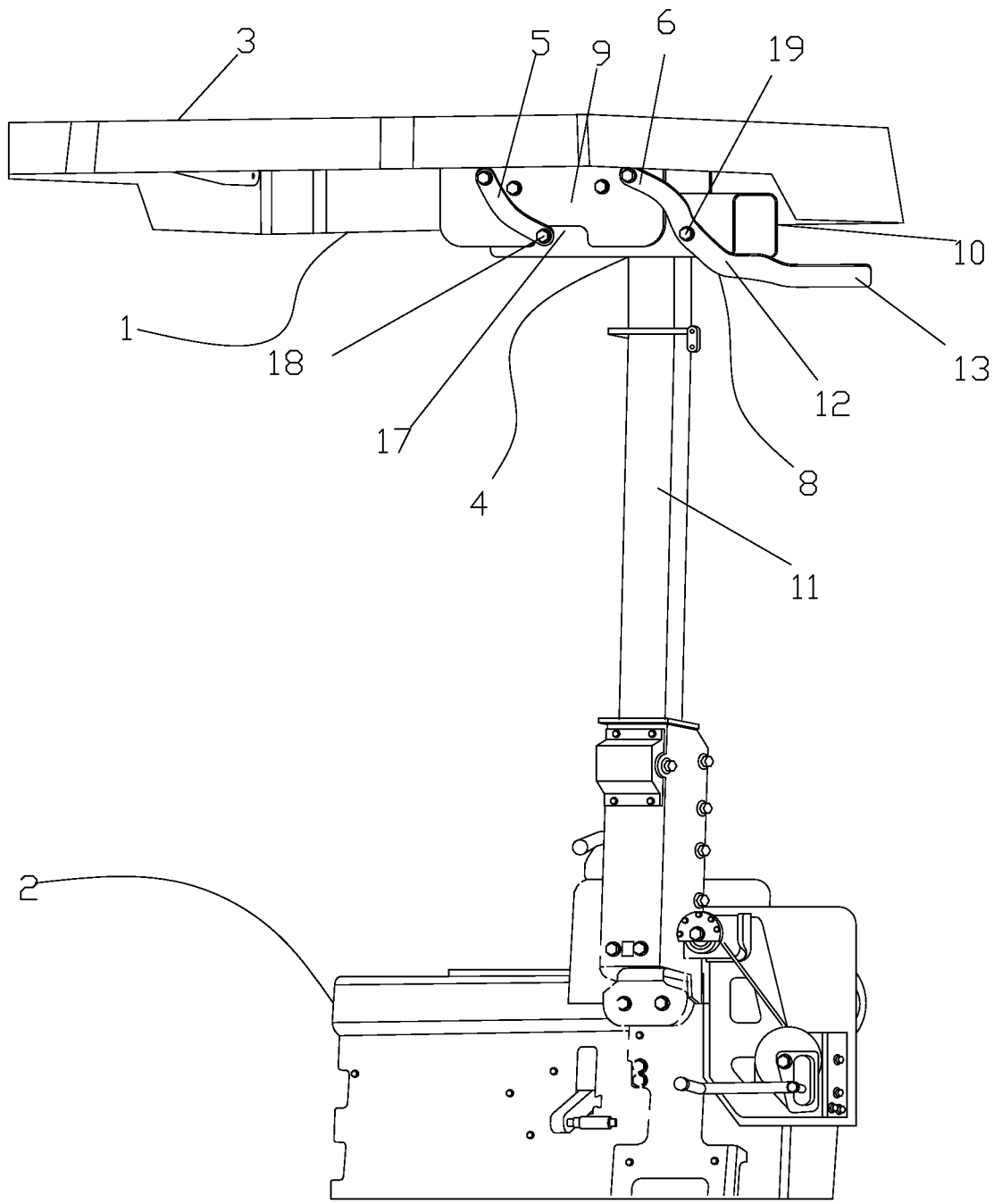
FIG. 1 shows a perspective view of an embodiment of operator's platform of an earth working machine having a protective canopy, in which the protective canopy is in the state of an extended operating position.
Figure 2:
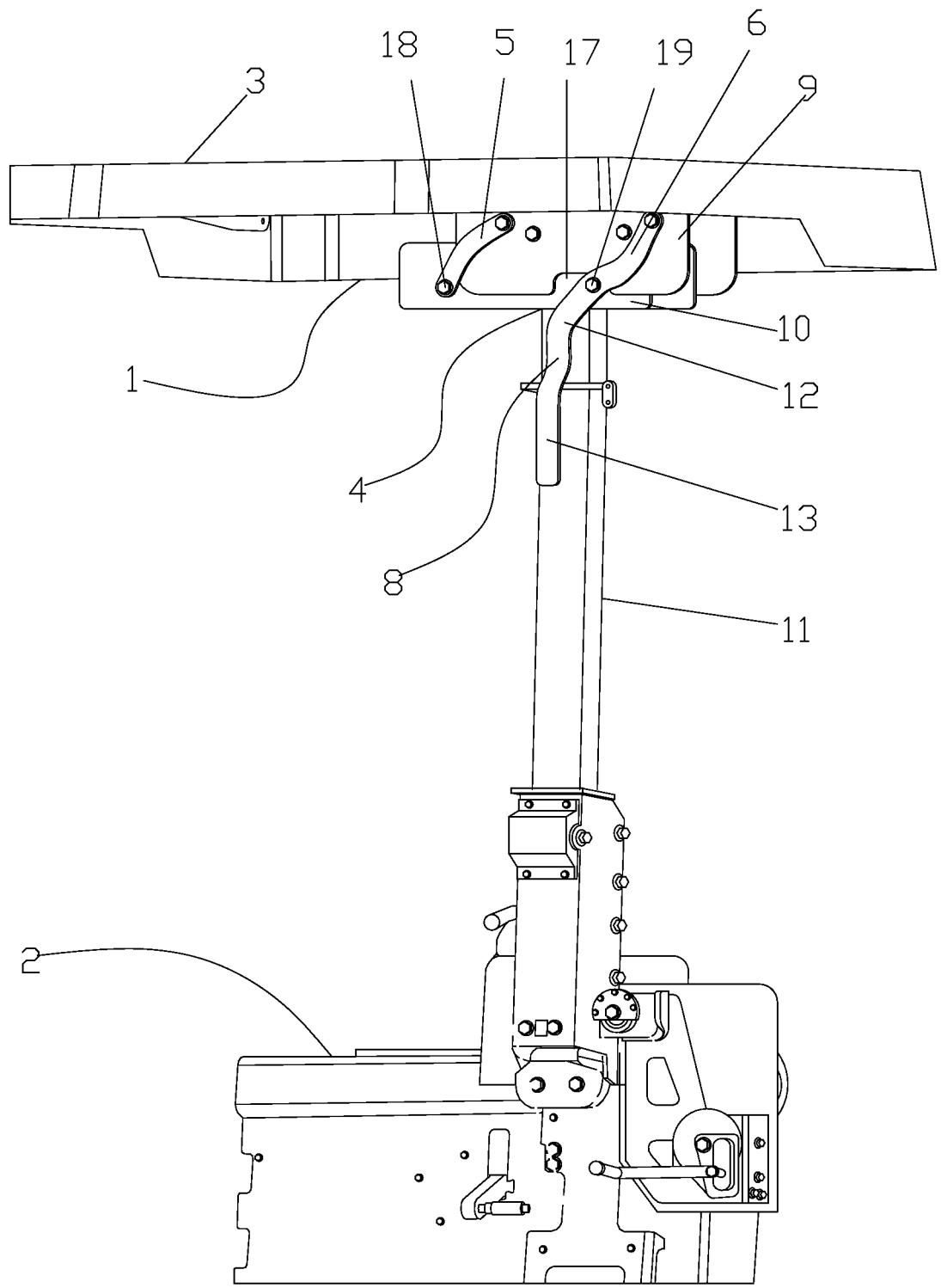
FIG. 2 shows a perspective view of an embodiment of operator's platform according to FIG. 1, in which the protective canopy is in the state of a retracted transport position.

FIG. 1 shows a perspective view of an embodiment of operator's platform of an earth working machine having a protective canopy 1, in which the protective canopy 1 is in the state of an extended operating position. FIG. 2 shows a perspective view of an embodiment of operator's platform according to FIG. 1, in which the protective canopy 1 is in the state of a retracted transport position. In the present embodiment, the earth working machine is a road milling machine, recycler, stabilizer, or surface miner.

As shown in FIGS. 1-2, the earth working machine has an operator's platform 2 and a protective canopy 1, the protective canopy 1 is connected to the operator's platform 2 of the earth working machine through a support, for example a supporting column 11 arranged in the substantially vertical direction of the machine as shown in FIGS. 1 and 2. The support serves as a part of the base of the protective canopy 1, or is set independently of the base of the protective canopy 1.

As shown in FIGS. 1-2, the protective canopy 1 has a canopy body 3, the canopy body 3 has a first position and a second position, wherein the first position is an extended operating position where the canopy body 3 of the protective canopy 1 protrudes from the lateral outer side of machine frame of the earth working machine, and the second position is a retracted transport position where the canopy body 3 of the protective canopy 1 does not protrude outside the footprint of the earth working machine. The protective canopy 1 is switchable relative to the operator's platform 2 between the extended operating position and the retracted transport position in the horizontal direction of the earth working machine, such that it protects an operator of the earth working machine from sun or rain. In the present embodiment, the canopy body 3 of the protective canopy 1 protrudes from the lateral outer side of machine frame of the earth working machine when the canopy body 3 is extended to the operating position, and the canopy body 3 of the protective canopy 1 does not protrude outside the footprint of the earth working machine when the canopy body 3 is retracted to the transport position. The protective canopy 1 of the earth working machine has no intermediate position but only the transport (very left) and the operating (very right) position, but the positions of the canopy according to the present invention can be better changed with less force and at a lower cost than canopy of construction machine of the prior art.

As shown in the FIGS. 1-2, the protective canopy 1 further comprises a canopy base 4, which is stationary, a first linkage 5 and a second linkage 6 for connecting the canopy body 3 to the canopy base 4. In the present embodiment, the first linkage 5, the second linkage 6, the canopy body 3 and the canopy base 4 constitutes a four-bar linkage mechanism. The switching of the protective canopy 1 according to the present invention between the first operating position and the second transport position is achieved by the four-bar linkage mechanism. Specifically, the first linkage 5 being pivotally connected to each of the canopy body 3 and the canopy base 4, respectively, and the second linkage 6 being similarly pivotally connected to each of the canopy body 3 and the canopy base 4, respectively, and the pivot axes at the connection points between the first linkage 5 and each of the canopy body 3 and the canopy base 4 and the pivot axis at the connection points between the second linkage 6 and each of the canopy body 3 and the canopy base 4 are parallel to each other, such that the canopy body 3, the canopy base 4, the first linkage 5 and the second linkage 6 together form a four-bar linkage mechanism capable of being manipulated.

As shown in the FIGS. 1-2, both the first linkage 5 and the second linkage 6 are bent outwardly, respectively, and the protective canopy 1 further comprises one manipulation component integrated with the second linkage 6. The manipulation component and the second linkage 6 form a lever structure with a pivoting point where they are connected. Specifically, the manipulation component comprises a connecting section 12 connected to the second linkage 6 and a force-application section 13 connected to the connecting section 12.

As shown in the FIGS. 1-2, the canopy body 3 is provided with a connection member 9 moving along with the canopy body 3, the first linkage 5 and the second linkage 6 are each pivotally connected to the connection member 9. In the present embodiment, the connection member 9 is integrated with the canopy body 3. The first linkage 5 is pivotally connected to the canopy base 4 by a first shaft 18, and the second linkage 6 is pivotally connected to the canopy base 4 by a second shaft 19, the connection member 9 abuts against the first shaft 18 at the first position and abuts against the second shaft 19 at the second position. In the present embodiment, the bottom edge of connection member 9 is provided with one opening 17, each of the first shaft 18 and the second shaft 19 is accommodated in the opening 17 at the first position and the second position of the canopy body 3, respectively. Moreover, in the present embodiment, the canopy base 4 comprises a base member 10, the first linkage 5 and the second linkage 6 are provided on opposite sides of the base member 10 and the connection member 9, respectively.

Figure 3:
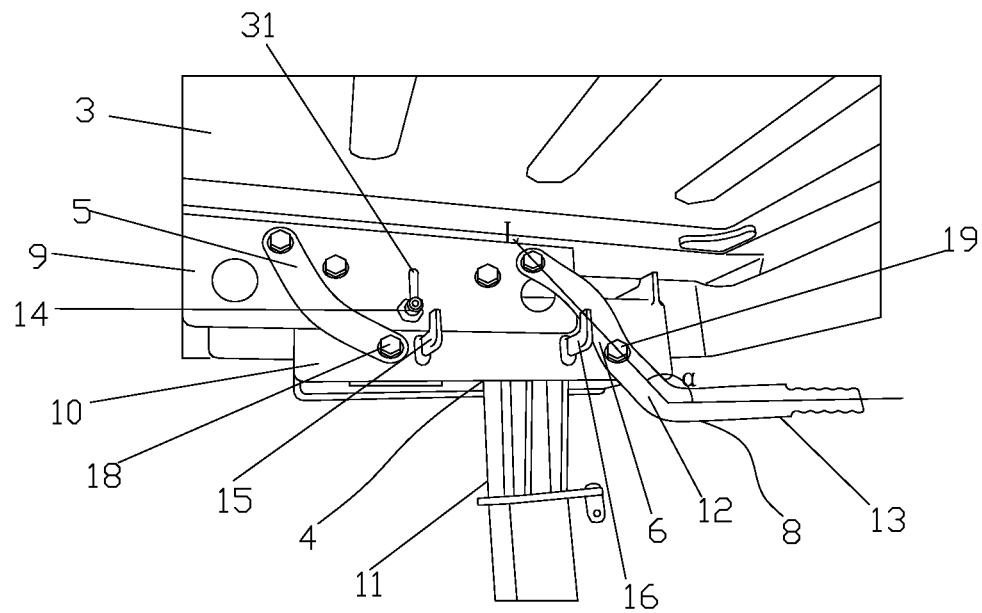
FIG. 3 shows the details of another embodiment of the protective canopy according to the present invention, in which the protective canopy is in the state of an extended operating position.
Figure 4:
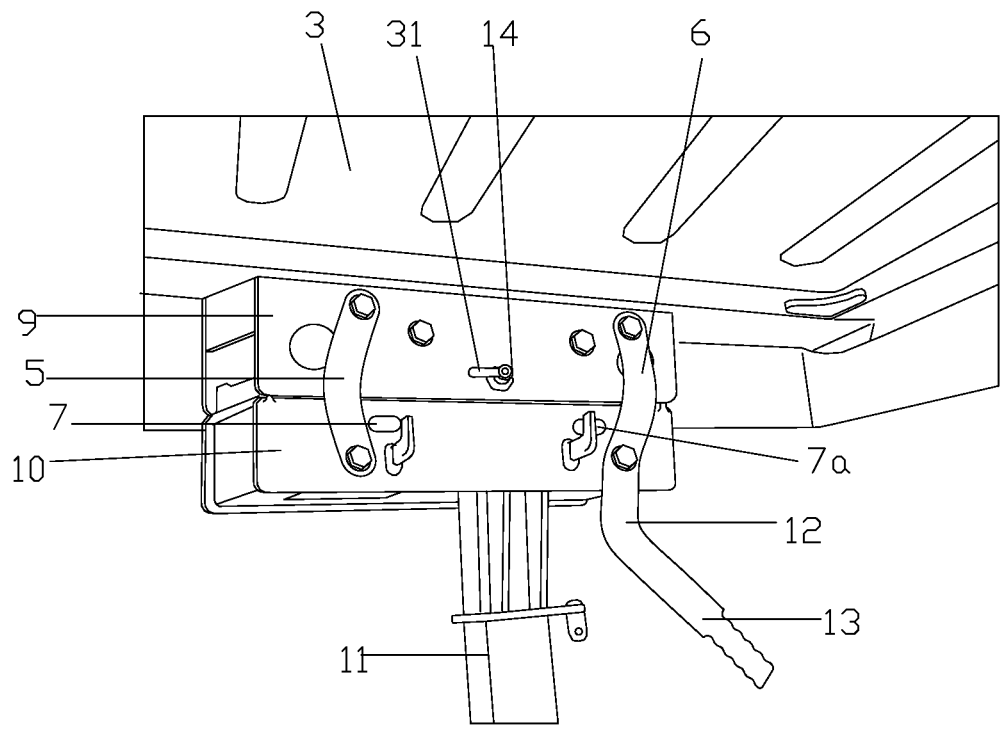
FIG. 4 shows the details of an embodiment of the protective canopy according to FIG. 3, in which the protective canopy is in the state of switching from an extended operating position to a retracted transport position.
Figure 5:
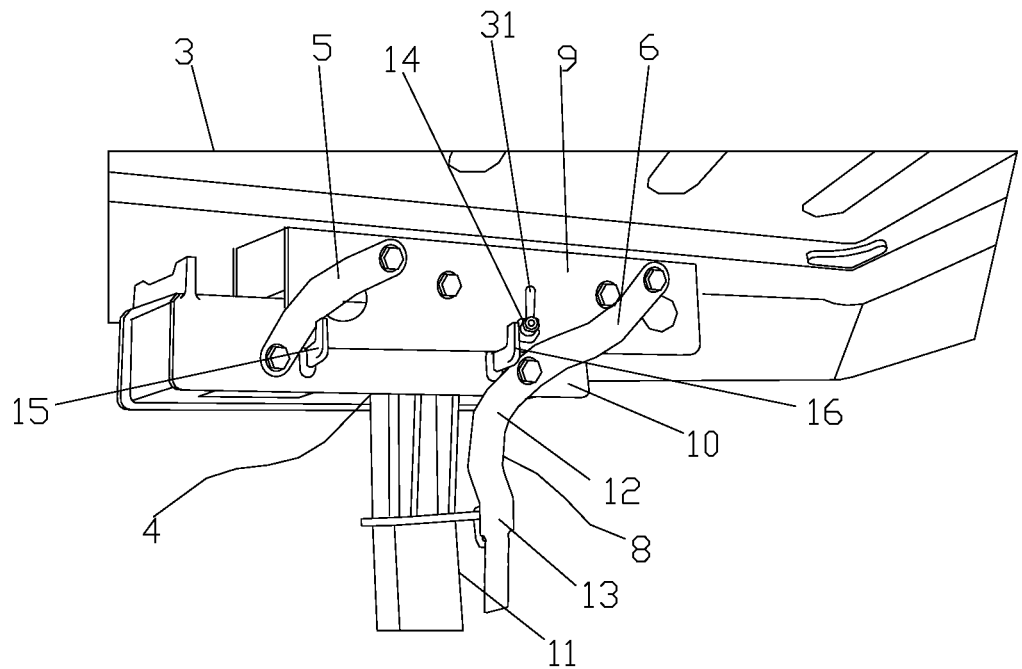
FIG. 5 shows the details of an embodiment of the protective canopy according to FIG. 3, in which the protective canopy is in the state of a retracted transport position.

FIG. 3 shows the details of a second embodiment of the protective canopy 1 according to the present invention, in which the protective canopy 1 is in the state of an extended operating position. FIG. 4 shows the details of the embodiment of the protective canopy 1 according to FIG. 3, in which the protective canopy is in the state of switching from an extended operating position to a retracted transport position. FIG. 5 shows the details of an embodiment of the protective canopy 1 according to FIG. 3, in which the protective canopy 1 is in a retracted transport position. As shown in FIGS. 3-5, the canopy body 3 of the protective canopy 1 can be switched from the extended operating position to the retracted transport position, and vice versa. This is achieved by the four-bar linkage mechanism capable of being manipulated and formed by the canopy body 3, the canopy base 4, the first linkage 5 and the second linkage 6. The first linkage 5 being pivotally connected to each of the canopy body 3 and the canopy base 4, respectively, and the second linkage 6 being similarly pivotally connected to each of the canopy body 3 and the canopy base 4, respectively. By manipulating at least one of the canopy body 3, the first linkage 5 and the second linkage 6, the canopy can be switched with respect to the canopy base 4 between the extended operating position and the retracted transport position.

As shown in FIG. 3, the connecting section 12 of the manipulation component is in the line of two pivotally connection points of the second linkage 6, and the force-application section 13 is at an angle of about 130° to the connecting section 12. In another embodiment, the angle may also be 100°, 120°, 125°, 135° or 150°. The operator can hold the force-application section 13 of the manipulation component by hand, and then apply force to the force-application section 13 to drive the second linkage 6, which in turn drives the first linkage 5 and the canopy body 3 to move, and finally realize the movement of the canopy body 3 from the operating position to the transport position or from the transport position to the operating position.

Figure 6:
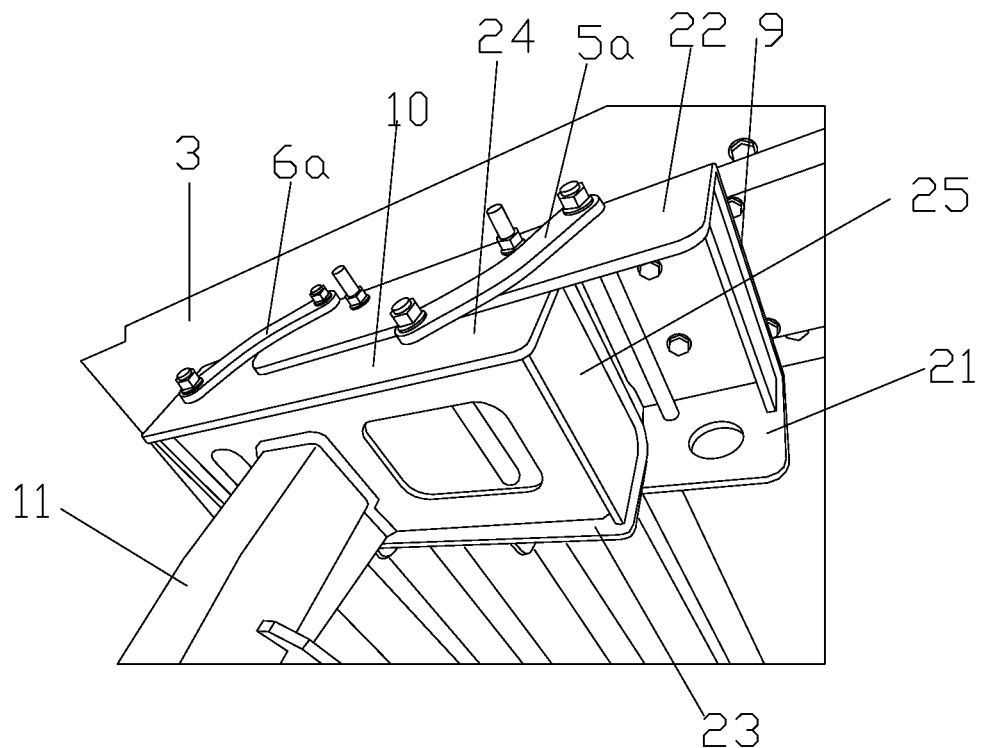
FIG. 6 shows the details of protective canopy viewed from the bottom of the base, in which additional first and second linkages located on the opposite side of protective base with respect to the manipulation component are shown.

As shown in the FIGS. 3-6, two first linkages 5, 5a are provided on opposite sides of the base member 10 and the connection member 9, and two second linkages 6, 6a are provided on opposite sides of the base member 10 and the connection member 9. FIGS. 3-5 show the first linkage 5 and the second linkage 6 on one side of the canopy body 3 and the canopy base 4. FIG. 6 shows the first linkage 5a and the second linkage 6a on the other side of the canopy body 3 and the canopy base 4.

As shown in FIGS. 1-6, the connection member 9 comprises a first upper side 21 and a second upper side 22 parallel to the first upper side 21, first linkage 5 and second linkage 6 are pivotally connected to the first upper side 21, and the first linkage 5a and the second linkage 6a are pivotally connected to the second upper side 22. The base member 10 comprises a first lower side 23, a second lower side 24 parallel to the first lower side and a top plate portion 25 connecting the top of the first lower side and the second lower side, the second ends of one first linkage 5 and one second linkage 6 are pivotally connected to the first lower side 23, and the second ends of the other first linkage 5a and the other second linkage 6a are pivotally connected to the second lower side 24.

Differing from the embodiment as shown in FIGS. 1-2, in the present embodiment as shown in the FIGS. 3-5, the protective canopy 1 further comprises a locking device 14 for locking the canopy body 3 at its first and second position. The locking device 14 may also be referred to as a lock 14. In a preferred embodiment, the locking device 14 is arranged on the canopy body 3 and moves along with the canopy body 3, and two locking holes 7, 7a are arranged on the canopy base 4 for cooperating with the locking device 14 when the canopy body 3 reaches its first and second positions, respectively. Alternatively, the locking device 14 is arranged on the canopy base 4, and the locking holes for cooperating with the locking device 14 are arranged on the canopy body 3. Preferably, the locking holes are elongated holes.

Figure 7:
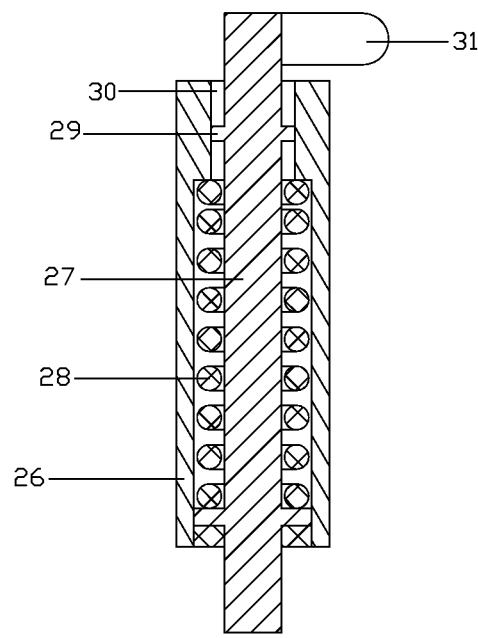
FIG. 7 shows the details of the locking device in a cross-section view, wherein the pin of the locking device is in its original position.
Figure 8:
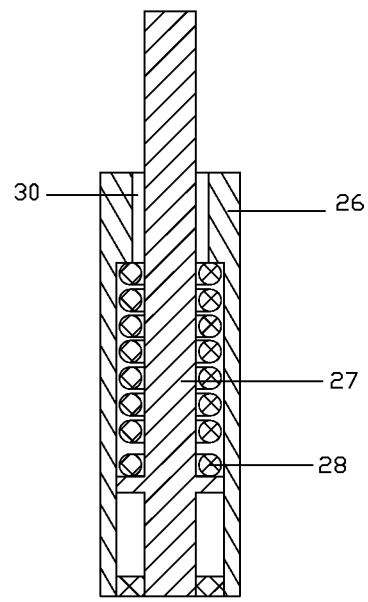
FIG. 8 shows the details of the locking device in a cross-section view, wherein the pin of the locking device is in its extracted position.

FIG. 7 shows the details of the locking device in a cross-section view, wherein the pin of the locking device is in its original position. FIG. 8 shows the details of the locking device in a cross-section view, wherein the pin of the locking device is in its extracted position. As shown in FIGS. 7-8, the locking device 14 is a spring-loaded pull in latch, which comprises a housing 26, a pin 27 and a spring element 28. The housing 26 can be fixed to the canopy body 3. The pin 27 is arranged in the housing 26, and the spring 28 is arranged in the housing 26 for providing load-force to the pin 27. The pin 27 is movable between an original position (also referred to as a closing position) and an extracted position (also referred to as an opening position). When the pin 27 is pulled, the pin is moving in the housing 26 and the spring element 28 is compressed. In case the pin 27 is pulled and the stop 29 is moved along the receiving slot 30 in the housing to a particular position, the pin 27 can be rotated to make at least one radial stop 29 provided on the pin 27 accommodated in corresponding part, such as the positioning portion (not shown in the figures) provided on the end surface of the housing 26. In this approach, the pin is held in the extracted position and cannot return back to the original position. If the pin is rotated to make the radial stop 29 leave positioning portion, the force of the spring element 28 makes the pin 27 return to the original position. That is, before shifting the canopy from its first position to second position and from its second position to first position, the operator can switch the pin 27 of the locking device 14 from its original position to its extracted position. Now the canopy body 3 is free to be shifted from its first operating position to second transport position or vice versa.

In the extracted position, the pin 27 is held stationary on the housing 26 against the load of the spring element 28. In case the pin 27 is rotated and its stop 29 is moved to the position of the opening of the receiving slot 30 at the end of the housing, the pin 27 is capable of being returned to its original position by the action of the spring element 28. When the canopy body reaches its first position and second position, the pin 27 of the locking device is in its original position and is inserting into the corresponding locking hole, so that the canopy body is locked in its first position and second position.

As shown in the FIGS. 3-5, two switch elements 15, 16 are provided on the canopy base, and arranged near to the movement trajectory of the pin when the canopy body moves from the first position to the second position and vice versa. During the movement of the canopy body 3 from the first position to the second position and from the second position to the first position, the two switch elements 15, 16 enable the pin 27 to be released from its extracted position, respectively.

As shown in FIGS. 3-5 and 7, the pin 27 has a wing 31 which is radially extended from the end of the pin, and when the wing contacts with the switch elements, it triggers the pin to rotate so that the pin is released from the extracted position. During the movement of the canopy body 3 from the first position to the second position and from the second position to the first position, the pin 27 is capable of being toggled to rotate by the engagement of the wing 31 and the corresponding switch element 15, 16, so that the pin 27 is capable of being released from its extracted position when the canopy reaches its final position. According to the protective canopy of the present invention, the spring element 28 cannot push out the pin 27 instantly before the canopy reaches its final position, i.e., there is no corresponding hole in the intermediate position where the pin 27 can go in. Therefore, only when the final position is reached, the spring 28 can push the pin 27 out and into the corresponding locking hole and close the latch, i.e., fix the canopy body 3 in its final position.

As shown in the FIGS. 3-5, the switch elements 15, 16 are a L-shaped flags, wherein at least a vertical portion of the L-shaped flag will contact the wing 31 of the pin 27 of the locking device 14 during the movement of the canopy body 3, such that the pin 27 is driven to rotate and then capable of being released from its extracted position when the canopy body 3 reaches its final position.

The invention claimed is:

1. A protective canopy, comprising:
   a canopy body;
   a canopy base; and
   first and second linkages, each of the first and second linkages being pivotally connected to both the canopy body and the canopy base at pivoting connections having pivot axes, all of the pivot axes being parallel to each other such that the canopy body is switchable relative to the canopy base between a first position and a second position by manipulating at least one of the first linkage, the second linkage and the canopy body, wherein the canopy body abuts against the canopy base or against a structure attached to the canopy base at both the first position and the second position.

2. The protective canopy of claim 1, wherein:
   the first and second linkages, the canopy body and the canopy base form a four-bar linkage mechanism.

3. The protective canopy of claim 1, further comprising:
   at least one manipulation component configured to drive at least one of the first linkage, the second linkage and the canopy body such that the canopy body is switchable relative to the canopy base between the first position and the second position by manipulating the manipulation component.

4. The protective canopy of claim 3, wherein:
   the at least one manipulation component is attached to at least a corresponding one of the first and second linkages; and the at least one manipulation component and the corresponding one of the first and second linkages form a lever with a pivoting point at the pivoting connection of the corresponding one of the first and second linkages and the canopy base.

5. A protective canopy, comprising:
a canopy body;
a canopy base; and
first and second linkages, each of the first and second linkages being pivotally connected to both the canopy body and the canopy base at pivoting connections having pivot axes, all of the pivot axes being parallel to each other such that the canopy body is switchable relative to the canopy base between a first position and a second position by manipulating at least one of the first linkage, the second linkage and the canopy body;
at least one manipulation component configured to drive at least one of the first linkage, the second linkage and the canopy body such that the canopy body is switchable relative to the canopy base between the first position and the second position by manipulating the manipulation component;
wherein the at least one manipulation component includes a connecting section connected to a corresponding one of the first and second linkages and a force-application section connected to the connecting section;
wherein the connecting section is aligned with the pivoting connections between the corresponding one of the first and second linkages and the canopy base and the canopy body; and
wherein the force-application section is at an angle to the connecting section in a range of from 100 to 150 degrees.

6. The protective canopy of claim 5, wherein:
the force-application section is an angle to the connecting section in a range of from 120 to 130 degrees.

7. A protective canopy, comprising:
a canopy body;
a canopy base; and
first and second linkages, each of the first and second linkages being pivotally connected to both the canopy body and the canopy base at pivoting connections having pivot axes, all of the pivot axes being parallel to each other such that the canopy body is switchable relative to the canopy base between a first position and a second position by manipulating at least one of the first linkage, the second linkage and the canopy body;
wherein the at least one manipulation component is integrally formed with the corresponding one of the first and second linkages.

8. A protective canopy, comprising:
a canopy body;
a canopy base; and
first and second linkages, each of the first and second linkages being pivotally connected to both the canopy body and the canopy base at pivoting connections having pivot axes, all of the pivot axes being parallel to each other such that the canopy body is switchable relative to the canopy base between a first position and a second position by manipulating at least one of the first linkage, the second linkage and the canopy body;
wherein both of the first and second linkages are bent away from each other.

9. A protective canopy, comprising:
a canopy body;
a canopy base; and
first and second linkages, each of the first and second linkages being pivotally connected to both the canopy body and the canopy base at pivoting connections having pivot axes, all of the pivot axes being parallel to each other such that the canopy body is switchable relative to the canopy base between a first position and a second position by manipulating at least one of the first linkage, the second linkage and the canopy body;
wherein the canopy body includes a connection member configured to move with the canopy body, and the pivoting connections of the first and second linkages to the canopy body are each defined on the connection member.

10. The protective canopy of claim 9, wherein:
the connection member abuts against the canopy base at both the first position and the second position of the canopy body.

11. The protective canopy of claim 10, wherein:
the pivoting connection of the first linkage to the canopy base is formed by a first shaft;
the pivoting connection of the second linkage to the canopy base is formed by a second shaft; and
the connection member abuts against the first shaft at the first position of the canopy body and against the second shaft at the second position of the canopy body.

12. The protective canopy of claim 11, wherein:
the connection member includes a bottom edge having an opening, and the first shaft or the second shaft is received in the opening at the first and the second positions of the canopy body, respectively.

13. The protective canopy of claim 9, wherein:
the protective canopy includes two of the first linkages on opposite sides of the canopy base and the connection member; and
the protective canopy includes two of the second linkages on opposite sides of the canopy base and the connection member.

14. The protective canopy of claim 1, further comprising:
a lock configured to lock the canopy body in each of its first and second positions.

15. The protective canopy of claim 14, wherein:
the lock is arranged on the canopy body and moves along with the canopy body.

16. The protective canopy of claim 15, wherein:
the canopy base includes two locking holes configured to receive the lock.

17. The protective canopy of claim 14, wherein:
the lock includes a housing, a pin and a spring, the pin being movable between an original position and an extracted position, the spring being uncompressed when the pin is in the original position, and the spring being compressed with the pin is in the extracted position.

18. The protective canopy of claim 17, wherein:
the pin includes a stop, and the pin is configured to be maintained at the extracted position by rotating the pin to engage the stop with a corresponding part of the housing.

19. The protective canopy of claim 17, further comprising:
two switch elements provided on the canopy base and arranged adjacent a movement trajectory of the pin when the canopy body moves between the first and second positions.

20. The protective canopy of claim 19, wherein:
the pin includes a wing extending radially from an end of the pin, the wing being configured such that when the wing contacts one of the switch elements the pin is rotated so that the pin is released from the extracted position.

21. The protective canopy of claim 1, wherein:
the first position is an extended operating position of the canopy body and the second position is a retracted transport position of the canopy body relative to the extended operating position.

22. The protective canopy of claim 1 in combination with an earth working machine, the earth working machine including an operator's platform, wherein the protective canopy is arranged to protect an operator located on the operator's platform.

23. The earth working machine of claim 22, wherein:
the canopy body of the protective canopy is switchable between the first position and the second position with respect to the operator's platform in a horizontal direction of the earth working machine.

24. An earth working machine, comprising:
an operator's platform; and
a protective canopy arranged to protect an operator located on the operator's platform, the protective canopy including:
a canopy body;
a canopy base; and
first and second linkages, each of the first and second linkages being pivotally connected to both the canopy body and the canopy base at pivoting connections having pivot axes, all of the pivot axes being parallel to each other such that the canopy body is switchable relative to the canopy base between a first position and a second position by manipulating at least one of the first linkage, the second linkage and the canopy body;
wherein the first position is an extended operating position wherein the canopy body of the protective canopy protrudes from a laterally outer side of a machine frame of the earth working machine; and
wherein the second position is a retracted transport position wherein the canopy body of the protective canopy does not protrude outside the laterally outer side of the machine frame.

25. The earth working machine of claim 24, wherein:
the earth working machine is a road milling machine, a recycler, a stabilizer or a surface miner.

26. A method of operating the nd earth working machine of claim 24, comprising:
extending the canopy body of the protective canopy relative to an operator's platform of the earth working machine; and
retracting the canopy body of the protective canopy relative to the operator's platform of the earth working machine.

* * * * *